United States Patent [19]
Hajjar et al.

[11] Patent Number: 5,742,573
[45] Date of Patent: Apr. 21, 1998

[54] COMPENSATION APPARATUS FOR RADIAL AND VERTICAL RUNOUT OF AN OPTICAL DISC

[75] Inventors: Roger A. Hajjar, Fairport; Stuart D. Perry; Mark A. Barton, both of Rochester, all of N.Y.

[73] Assignee: Eastman Kodak Company, Rochester, N.Y.

[21] Appl. No.: 642,385

[22] Filed: May 3, 1996

[51] Int. Cl.$^6$ .................................................. G11B 7/095
[52] U.S. Cl. .................. 369/44.32; 369/44.34; 369/54; 369/58
[58] Field of Search .................. 369/44.32, 44.34–44.36, 369/50, 54, 58

[56] References Cited

U.S. PATENT DOCUMENTS

| | | | |
|---|---|---|---|
| 3,881,184 | 4/1975 | Koepcke et al. | 369/44.34 X |
| 4,439,848 | 3/1984 | Ceshkovsky et al. | |
| 4,764,914 | 8/1988 | Estes et al. | 369/58 |
| 4,866,688 | 9/1989 | Ohtake et al. | |
| 5,121,374 | 6/1992 | Barton et al. | 369/44.29 |
| 5,532,990 | 7/1996 | Koyama et al. | 369/44.32 |
| 5,539,714 | 7/1996 | Andrews, Jr. et al. | 369/44.32 X |

*Primary Examiner*—W. R. Young
*Attorney, Agent, or Firm*—Raymond L. Owens

[57] ABSTRACT

An apparatus for compensating for radial and vertical runout of an optical disc using an actuator having a lens for focus of a laser beam and wherein the focus and tracking currents control the position of the lens in the vertical and radial directions is disclosed. The apparatus focuses the actuator lens along at least one revolution of a track on an optical disc and producing lens position signals. Structures provided which responds to the lens position signals to produce the frequency content of surface height and track deviations of the optical disc using a frequency transform technique. The surface height and track deviations frequency content are stored and a signal representing the focusing and tracking actuator currents and in response to the focusing and tracking actuator current signals and the stored surface height and track deviation frequencies the lens position is controlled thereby reducing focusing and tracking errors.

9 Claims, 3 Drawing Sheets

COMPENSATION APPARATUS FOR RADIAL AND VERTICAL RUNOUT OF AN OPTICAL DISC

FIELD OF THE INVENTION

The present invention relates to an apparatus for compensating radial and vertical runout of an optical disc.

BACKGROUND OF THE INVENTION

In optical data recording, an optical source, typically a laser or laser diode, generates an incident write or read signal in the form of a radiation beam. The beam is applied to an optical medium through a focusing lens to record or read data thereon. To facilitate proper application of the beam to the medium (typically a disc), focusing and tracking servos are used to control vertical and radial positions of the lens by means of an actuator. A focusing servo maintains a focused spot of less than 2 µm on the surface of the medium while a tracking servo maintains the focused spot within preformatted spiral or concentric tracks spaced by less than 5 µm. Certain types of media, such as compact disc recordable (CD-R) media, include a performed spiral tracking structure typically referred to as a groove or pregroove having a width of 0.4 µm and spaced by 1.6 µm. Due to changes or tolerances in the manufacturing conditions of optical discs, e.g. changes in the press force, the disc surface might be distorted (e.g., saddle shape) and the tracks might not be perfectly concentric or spiral. Furthermore, the center hole of the medium, into which the center spindle of the apparatus is inserted, may not be completely concentric, or the shaft of the motor for spinning the medium may not be coaxial with the medium. In addition, disc loading and clamping mechanisms might cause further distortion of the disc shape. Due to such deformations of the disc, well known closed loop focusing and tracking servos become severely challenged, and in some instances may be unable to properly maintain a focused spot in the center of a desired track. As a result, vertical and radial runout sinewave compensation techniques have been described in the literature (see U.S. Pat. Nos. 5,121,374 and 4,764,914).

Known runout compensation techniques consist of storing focus and tracking lens actuator current signals as a function of rotation of the disc. The focus and tracking current signals correspond to vertical excursions of the disc surface and radial eccentricities of the tracks, respectively. Runout correction signals for both focusing and tracking are derived from the actuator current signals and added to the output of the focusing and tracking servos. Typically, a runout signal has a frequency which is the same as the fundamental frequency of the rotation of the disc. It is desirable that the runout signal contains additional frequency components. However, due to the nature of the servo response, the current signal is not optimum for determining which additional frequency components to include.

It is therefore the object of the present invention to provide an improved runout signal by using a lens position signal (LPS) representing vertical and radial position of the lens.

SUMMARY OF THE INVENTION

It is therefore the object of the present invention to compensate for runout caused by an optical disc or drive.

This object is achieved in an apparatus for compensating for radial and vertical runout of an optical disc using an actuator having a lens for focus of a laser beam and wherein the focus and tracking currents control the position of the lens in the vertical and radial directions, comprising:

a) means for focusing the actuator lens along at least one revolution of a track on an optical disc and producing lens position signals;

b) means responsive to the lens position signals to produce the frequency content of surface height and track deviations of the optical disc using a frequency transform technique;

c) means for storing such surface height and track deviations frequency content;

d) means for storing a signal representing the focusing and tracking actuator currents; and e) means responsive to the focusing and tracking actuator current signals and the stored surface height and track deviation frequencies to control the lens position and thereby reduce focusing and tracking errors.

It is a feature of the present invention to provide an effective structure for runout compensation by using vertical and radial lens position sensors representing vertical excursions and radial eccentricities. The lens position signals are used to determine the frequency components required for feedforward compensation.

DETAILED DESCRIPTION OF THE INVENTION

Figure 1A:
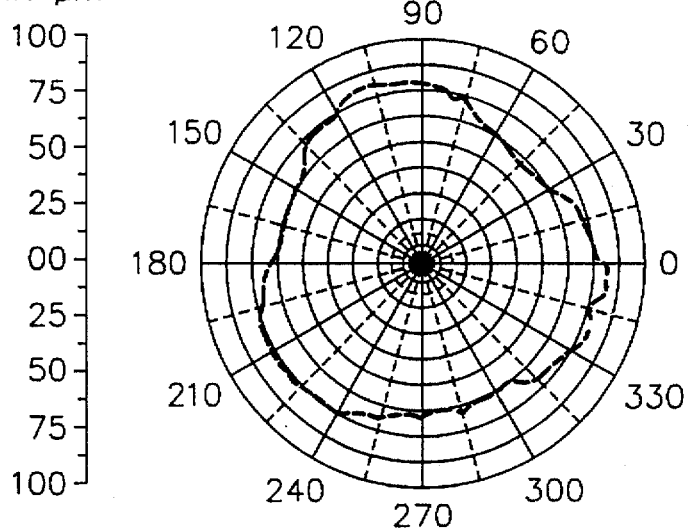
FIG. 1 depicts track deviations of polar plots of an optical disc at three different radii.
Figure 1B:
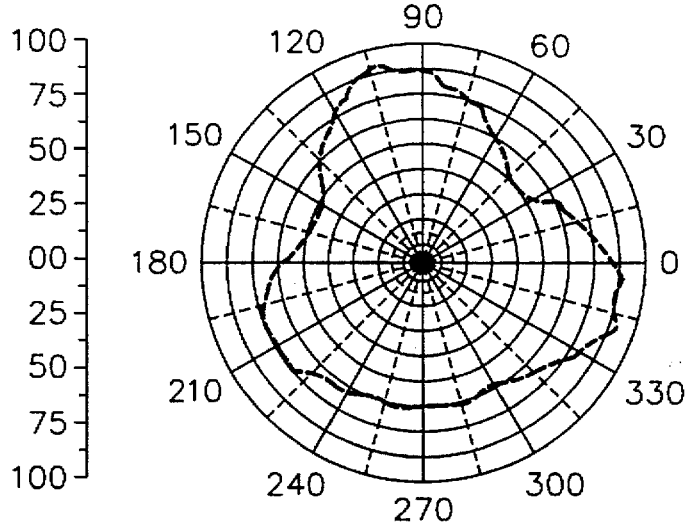
Figure 1C:
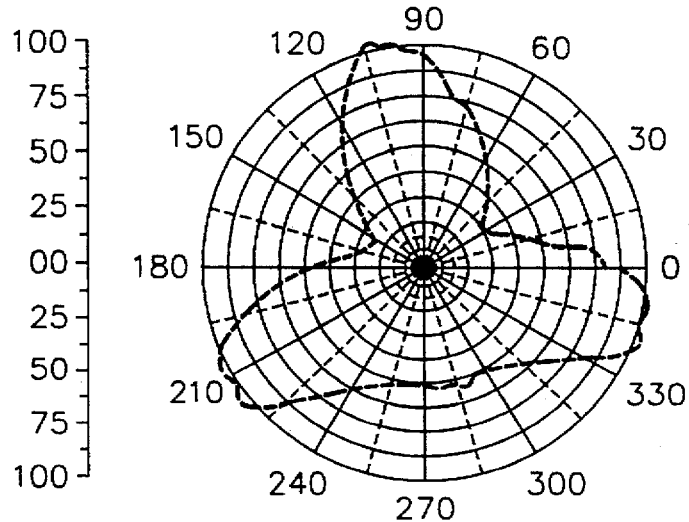

As mentioned above, low frequency radial and vertical deviations of optical media (below 500 Hz) challenge the capability of the focusing and tracking servos. Consider, for example, radial track deviation on an optical disc measured at three locations in FIG. 1, i.e. at the inner, middle, and outer radius using a Radial Lens Position Sensor (RLPS) while the tracking servo is closed. As shown in FIG. 1 there are three polar plots of optical discs with different radii, where R is the radius in µm; std is the standard deviation in µm, and pp is the peak-to-peak dimension in µm. An increase in track distortion is observed across the disc from the inner to the outer radius which is also reflected by the peak-to-peak (pp) and standard deviation (std) of the track deviation from circularity in µm (to the right of the polar plot). The track distortion appears to be largest at the outer diameter with a maximum excursion of 7.3 µm and a dominant frequency that is three times that of the rotation frequency. The tracking servo will insure that the optical spot follows the track, however, due to its finite gain, a residual tracking error will appear, i.e., the spot is offset from the center of the track.

Figure 2:
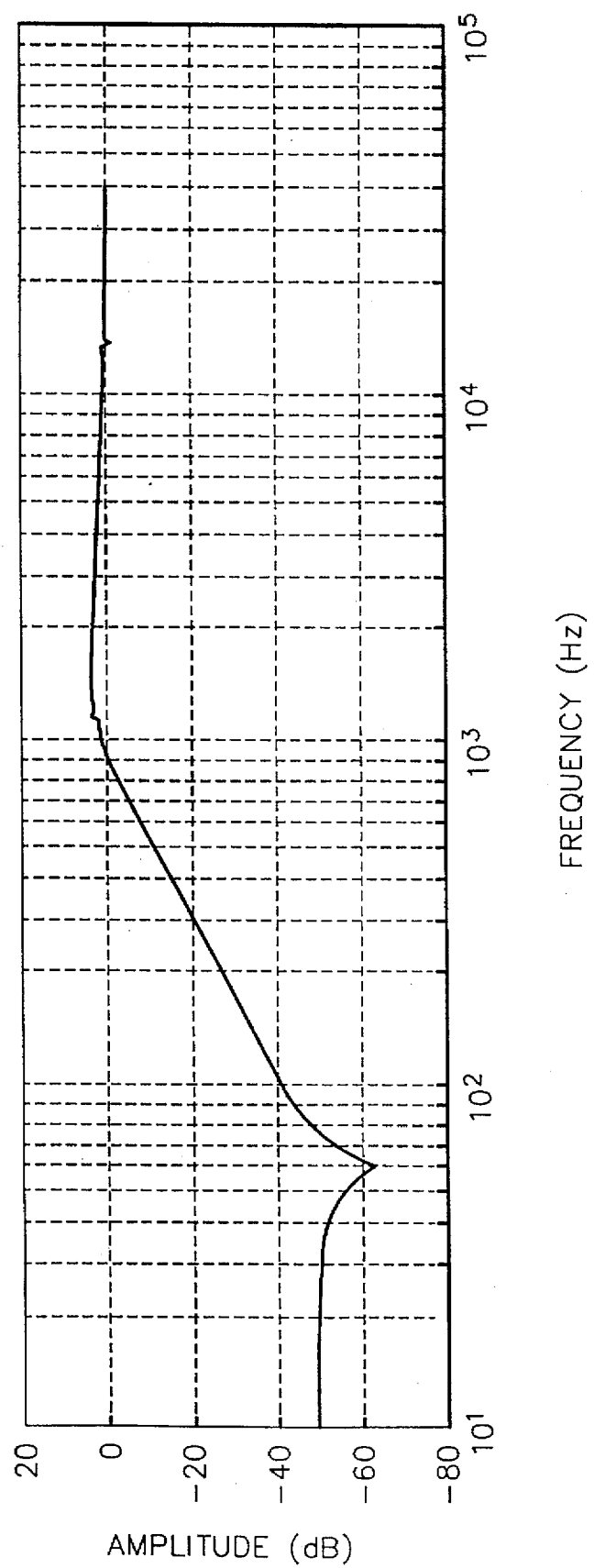
FIG. 2 depicts a typical disturbance rejection of a tracking servo without a compensation technique.

FIG. 2 shows the "disturbance rejection" of a typical tracking servo versus frequency. Given the rotation of the disc and the track shape shown in FIG. 1 at the outer radius, the disturbance tracking frequency is about 100 Hz.

In FIG. 2, the rejection of the tracking servo is about 40 dB. The tracking servo will reduce the excursion at this frequency by a factor of 100. When the peak-to-peak of the track excursion at the outer diameter is 7 µm, the tracking error is 7/100=0.07 µm or 70 nm, i.e., the optical spot will deviate from the center of the track by 70 nm which is a considerable track offset that might degrade the performance of the overall system. Using a feedforward signal at this frequency can help the tracking servo to better maintain the spot in the center of the track. As with any feedforward application, the objective here is to provide a correction signal in anticipation of a disturbance. The anticipation is made possible by the repetitive nature of the runout from one revolution to the next.

The fundamental principles in using a feedforward for runout compensation are substantially the same for the focus, fine tracking, and radial (coarse) tracking servos. While the servo system is actively regulating to the desired position, the driving signal (usually a current signal) to the actuator is measured as of function of lime (or, equivalently, angular position of the writing surface). This driving signal is sampled and filtered to extract the repeatable frequency components of interest. Finally, the filtered drive signal is applied to the target actuator. The result of this procedure is the application of a band-limited and repetitive (with each revolution of the media) driving signal to the actuator. In this way, the servo is only required to correct for non-repeatable disturbances to the system. Note that many methods of frequency-selective filtering can be applied, including low-, high-, and band-pass filters, and special techniques such as extraction of frequency components via transform methods such as a Fourier transform.

The common approach to extracting the feed forward drive signal to the actuator is to sample the servo's drive signal directly. However, due to fundamentals of servo design, this signal is substantially wider bandwidth than the repeatable portion of the runout, and therefore is a noisy representation of the actuator drive signal. It is also prone to aliasing effects, unless it is sampled at an exceedingly high rate relative to the repetitive runout. Consequently, a large amount of data must be taken and manipulated to develop the feed forward signals.

Figure 3:
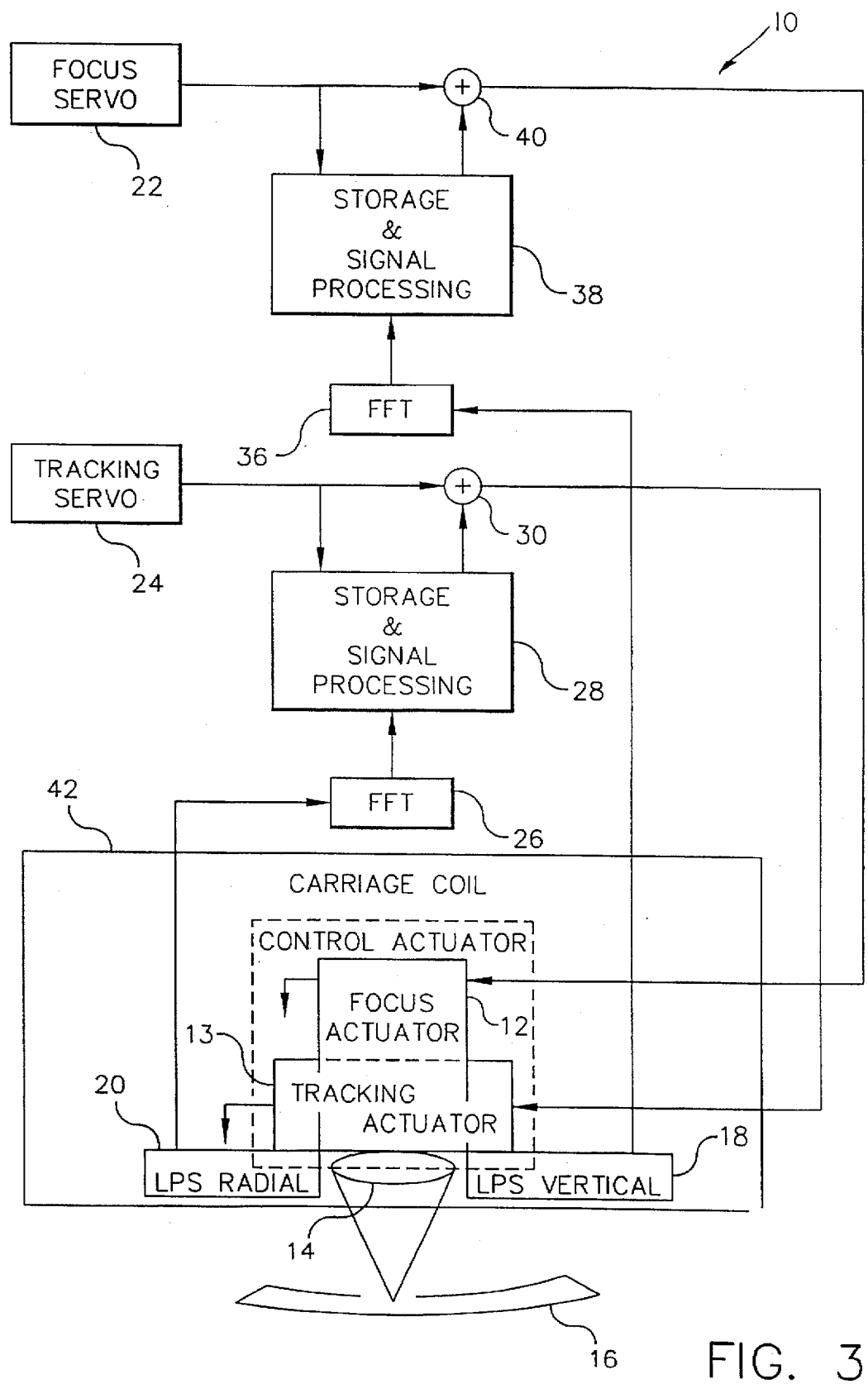
FIG. 3 is a block diagram of an apparatus in accordance with the present invention.

FIG. 3 is a block diagram of apparatus 10 in accordance with the present invention which provides for tracking and (fine) focusing servo. The apparatus 10 includes a focus actuator 12 shown in schematic form. As is well understood by those in the art, the focus actuator 12 has an objective lens 14 which focuses an optical spot onto a surface of an optical disc 16. In addition, there is a tracking actuator 13 which, as is well known in the art, positions the objective lens 14 along the track of the disc. The focus actuator 12 includes a standard vertical lens position sensor 18 and a standard radial lens position sensor 20. These position sensors are well known in the art and are adapted to produce signals representing the vertical and radial runout of the optical disc 16. The actuators 12 and 13, of course, have their own coils for respectively positioning the objective lens 14 in the vertical position and in the radial or tracking position. The actuator currents for the focus and tracking actuators 12 and 13, respectively, control the position of the objective lens 14. These currents are provided by a focusing control servo 22 and a tracking servo 24, respectively. These servos are well known in the art. (See U.S. Pat. Nos. 4,866,688 and 4,439, 848).

The vertical and radial lens position sensors 18 and 20 are used to determine the position of the objective lens 14 relative to its frame of reference (the locations of the motive force on the actuator). In accordance with this invention, the most significant drive signal frequencies to the actuator are determined and used. Preferably, a filtering method is adapted to the frequency content of the runout and a reduced amount of computation is performed. This technique is equally applicable to the focus actuator 12 and the tracking actuator 13. In order to simplify the discussion of the present invention, tracking runout will now be discussed.

First, during an optical disc 16 initialization phase, the tracking loop is closed with a carriage 42 at a fixed position. The carriage 42 is only shown in block form, but it will be understood to include support rails, bearings, magnets, and coils. Holding the carriage 42 at one position during this procedure (that is, not adjusting its position based on the measured track runout) will result in a large and easily measurable position error signal. This is accomplished by controlling the carriage 42 to a specific radius (using an external carriage position sensor or encoder). Another method is to simply leave the carriage control off, and rely on the inertia of the carriage 42 to effectively "hold" at a radius. This is effective because of the short period of time required to measure the runout. As the tracking servo 24 follows the track (with the carriage 42 at a fixed position), the radial lens position sensor 20 is used to obtain a high accuracy measure of the track runout. The tracking servo 24 produces the drive current for the tracking actuator 13. The radial lens position sensor 20 signal is sampled, and a Fourier series representation is calculated by either a microprocessor or dedicated hardware shown as logic and control unit 26. Either a simple Fourier series or an FFT technique can be used in accordance with the present invention. Although a Fourier transform is preferred, other types of frequency transforms can, of course, be used as will be understood by those skilled in the art. This Fourier series describes the tracking rimout in terms of its spatial frequency in multiples of once per revolution. By inspecting the Fourier series, the largest and therefore most significant harmonics are identified. A subset of harmonics are thereby chosen to be represented in the feed forward signal based on their relative amplitudes. This process can be repeated by the logic and control unit 26 at a plurality of radii, if the media is capable of exhibiting a different runout characteristic as a function of radius.

While the tracking actuator 13 is in normal operation, and the tracking servo 24 and optionally the carriage 42 following servo are on, the actuator drive signal is stored in a signal processing and storage unit 28. The high sampling rate must still be utilized to avoid aliasing effects, but the previously obtained information identifies which harmonics of the once per revolution runout are most significant. Using this information, the selected terms of a Fourier series representation of the actuator drive signal, are calculated by the signal processing and storage unit 28. Then a feedforward drive signal is produced by the signal processing and storage unit 28 by performing a reverse Fourier on the selected terms. An adder 30 adds the feedforward signal to the tracking actuator current produced by the tracking servo 24. The resulting signal is then applied to the actuator tracking coil for controlling the lens in the tracking position. The feedforward signal can be further refined by periodically re-measuring the actuator drive signal, finding the selected terms of the Fourier series representation, and averaging them with previous iterations Fourier series representations.

Note that the feedforward driving signal to the tracking actuator 13 can also be re-synthesized to drive the carriage 42. However, the partition between the carriage 42 and the tracking actuator 13 must be known (that is, how much of the runout to remove with carriage motion, and how much to remove with the tracking actuator). Also note that once the carriage 42 is driven with a feedforward, the radial lens position sensor's 20 output no longer contains the full information about the track runout (the driving signal to both actuators must now be interrogated).

Vertical runout is also achieved in a similar fashion to radial runout. For example, the vertical position signal produced by vertical lens position sensor 18 is provided to a dedicated logic and control unit 36, which provides the same function as the logic and control unit 26, but on the vertical position signal. The signal processing unit 38, which provides the same function as the signal processing and storage unit 28, provides its output signal to an adder 40 which then produces a signal which is applied to the vertical coil of the focus actuator 12 to control the position of the objective lens 14 in the focus position.

Although radial and vertical runout can be separately provided, it is highly advantageous to use the present invention with both focus and tracking control.

In another embodiment, a mathematical model of the actuator can be stored within the signal processing unit. It is used to determine the feedforward drive signal to the actuator from the lens position signal. A simple mathematical model of an actuator is generally quite accurate, especially in the frequency range where repeatable runout occurs. This technique is applicable to focus, tracking, and the radial access actuator as described below.

The tracking loop is closed with the carriage 42 which mounts the focus and tracking actuators 13 and objective lens 14 at a fixed position. This is achieved by the same means as in the first embodiment. As the tracking actuator 13 follows the track (with the carriage 42 at a fixed position), the radial lens position sensor 20 is used to obtain a high accuracy measure of the track runout. The position sensor signal is sampled, and a Fourier series representation is calculated (by either a simple fouries series or an FFT technique). A feedforward drive signal transform, is developed by dividing the position sensor signal transform by the actuator's open-loop frequency response (calculated or measured). The feed forward signal is then found by performing a reverse transformation on the feed forward drive signal transform.

Similar to the first embodiment, the same lens position data used to calculate the feedforward driving signal to the tracking actuator 13 can also be re-used to calculate the feedforward drive signal to the carriage 42. However, the designer must be cautious in partitioning between the carriage 42 and the tracking actuator. Since the actuation of the carriage 42 in the same frequency range as the tracking actuator with completely correlated feed forwards dramatically modifies the open-loop transfer function of the tracking actuator. Also note that once the carriage is driven with a feedforward, the position sensor's output no longer contains the full information about the track runout.

The invention has been described in detail with particular reference to certain preferred embodiments thereof, but it will be understood that variations and modifications can be effected within the spirit and scope of the invention.

PARTS LIST

| | |
|---|---|
| 10 | apparatus |
| 12 | focus actuator |
| 13 | tracking actuator |
| 14 | objective lens |
| 16 | optical disc |
| 18 | vertical lens position sensor |
| 20 | radial lens position sensor |
| 22 | focusing control servo |
| 24 | tracking servo |
| 26 | logic and control unit |
| 28 | signal processing and storage unit |
| 30 | adder |
| 36 | logic and control unit |
| 38 | signal processing unit |
| 40 | adder |
| 42 | carriage |

We claim:

1. Apparatus for compensating for radial and vertical runout of an optical disc using an actuator having a lens for focus of a laser beam and wherein focus and tracking currents control the position of the lens in the vertical and radial directions, respectively, comprising:

a) means for focusing the actuator lens along at least one revolution of a track on an optical disc and producing lens position signals;

b) means responsive to the lens position signals to produce the frequency content of surface height and track deviations of the optical disc using a frequency transform technique;

c) means for storing such surface height and track deviations frequency content;

d) means for storing a signal representing the focusing and tracking actuator currents; and e) means responsive to the focusing and tracking actuator current signals and the stored surface height and track deviation frequencies to control the lens position and thereby reduce focusing and tracking errors.

2. The apparatus as set forth in claim 1 wherein tracking current controls the position of the lens in a tracking direction and including a radial tracking actuator.

3. Apparatus for compensating for vertical runout of an optical disc using an actuator having a lens for focus of a laser beam and wherein focus current controls the position of the actuator lens in a focus direction, comprising:

a) means for focusing the actuator lens along at least one revolution of a track on an optical disc and for producing a vertical lens position signal;

b) means responsive to the vertical lens position signal to produce the frequency content of surface height deviations of the optical disc;

c) means for storing such surface height frequency content;

d) means for storing a signal representing the focusing actuator current;

e) means responsive to the focusing actuator current signal and the stored surface height frequency components to produce a feedforward current; and f) means for adding the feedforward current to the focusing actuator current to control the focusing actuator thereby reducing focusing error.

4. Apparatus as set forth in claim 3 wherein tracking current controls the position of the lens in a tracking direction and including a radial tracking actuator and including:

g) means for tracking the actuator lens along at least one revolution of a track on an optical disc and for producing a radial lens position signal;

h) means responsive to the radial lens position signal to produce the frequency content of track deviations of the optical disc;

i) means for storing such tracking deviation frequency content;

j) means for storing a signal representing the actuator tracking current;

k) means responsive to the tracking actuator current signal and to the stored track deviation frequency components to produce a feedforward current; and l) means for adding the feedforward current to the tracking actuator current to control the tracking actuator thereby reducing tracking error.

5. Apparatus for compensating for vertical runout of an optical disc using an actuator having a lens for focus of a laser beam and wherein focus current controls the position of the actuator lens in a focus direction, comprising:

a) means for focusing the actuator lens along at least one revolution of a track on an optical disc and for producing a vertical lens position signal;

b) means responsive to the vertical lens position signal to produce the frequency content of surface height deviations of the optical disc;

c) means for storing such surface height frequency content; and d) means responsive to a stored open-loop focusing-actuator frequency response and the stored surface height frequency components to produce a feedforward current.

6. Apparatus as set forth in claim 5 wherein tracking current controls the position of the lens in a tracking direction and including a radial tracking actuator and including:

e) means for tracking the actuator lens along at least one revolution of a track on an optical disc and for producing a radial lens position signal;

f) means responsive to the radial lens position signal to produce the frequency content of track deviations of the optical disc;

g) means for storing such tracking deviation frequency content;

h) means responsive to a stored .open-loop tracking-actuator frequency response and the stored track deviation frequency components to produce a feedforward current.

7. Apparatus for compensating for radial runout of an optical disc using an actuator having a lens for focus of a laser beam, comprising:

a) means for tracking the actuator lens along at least one revolution of a track on an optical disc and for producing a radial lens position signal;

b) means responsive to the radial lens position signal to produce frequency content of track deviations of the optical disc;

c) means for storing such tracking deviation frequency content;

d) means for storing a signal representing the actuator tracking current;

e) means responsive to the tracking actuator current signal and to the stored track deviation frequency components to produce a feedforward current; and f) means for adding the feedforward current to the tracking actuator current to control the tracking actuator thereby reducing error.

8. The apparatus as set forth in claim 7 wherein the actuator tracking current signal is provided by a stored model of actuator tracking current.

9. Apparatus as set forth in claim 7 wherein tracking current controls the position of the lens in a tracking direction and including a radial tracking actuator and including:

g) means for tracking the actuator lens along at least one revolution of a track on an optical disc and for producing a radial lens position signal;

h) means responsive to the radial lens position signal to produce the frequency content of track deviations of the optical disc;

i) means for storing such tracking deviation frequency content;

j) means for storing a signal representing the carriage current;

k) means responsive to the carriage current signal and to the stored track deviation frequency components to produce a feedforward current; and l) means for adding the feedforward current to the carriage current to control the carriage thereby reducing tracking error.

* * * * *